Oct. 9, 1934.  R. S. TROTT  1,976,702
ENGINE MOUNTING
Filed Nov. 30, 1931  3 Sheets-Sheet 1
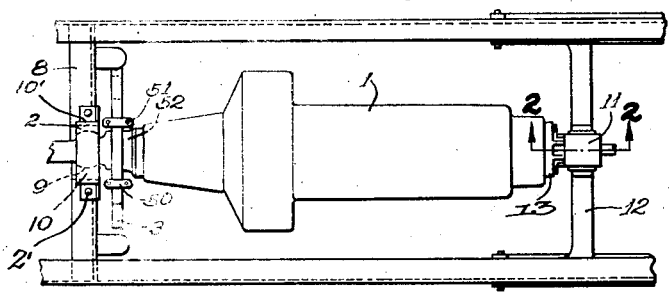
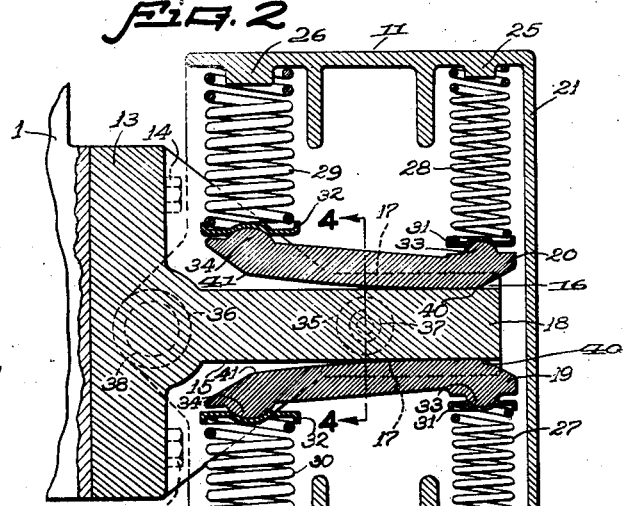
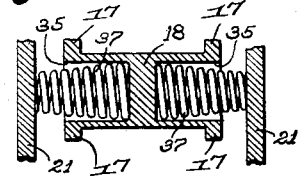
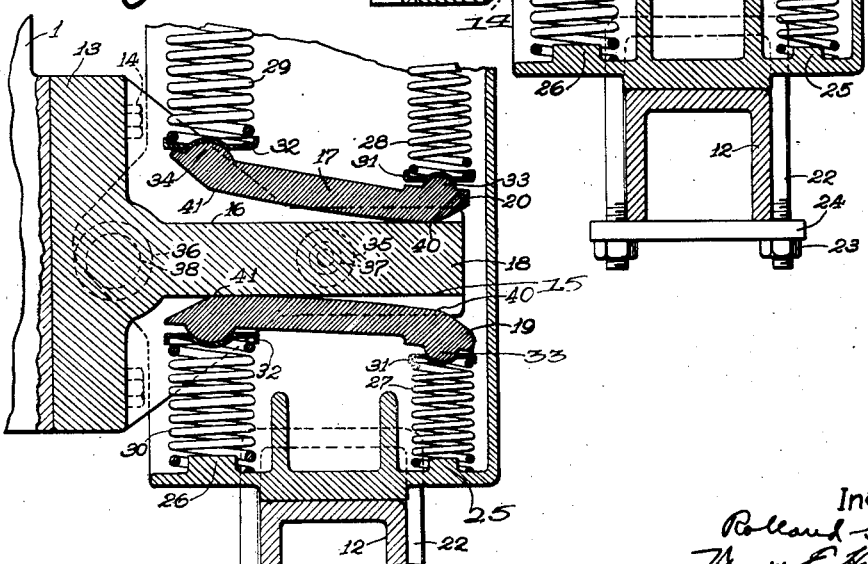

Oct. 9, 1934.                R. S. TROTT                    1,976,702
                          ENGINE MOUNTING
                     Filed Nov. 30, 1931          3 Sheets-Sheet 2

Inventor
Rolland S. Trott
Vernon E. Hodges
by Attorney

Oct. 9, 1934.  R. S. TROTT  1,976,702
ENGINE MOUNTING
Filed Nov. 30, 1931   3 Sheets-Sheet 3
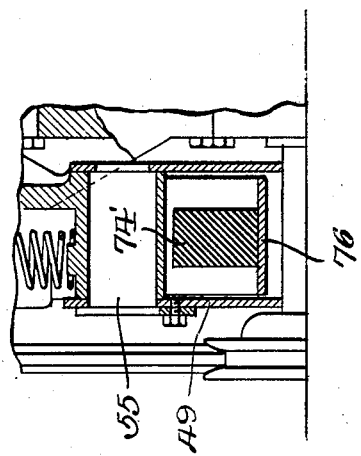
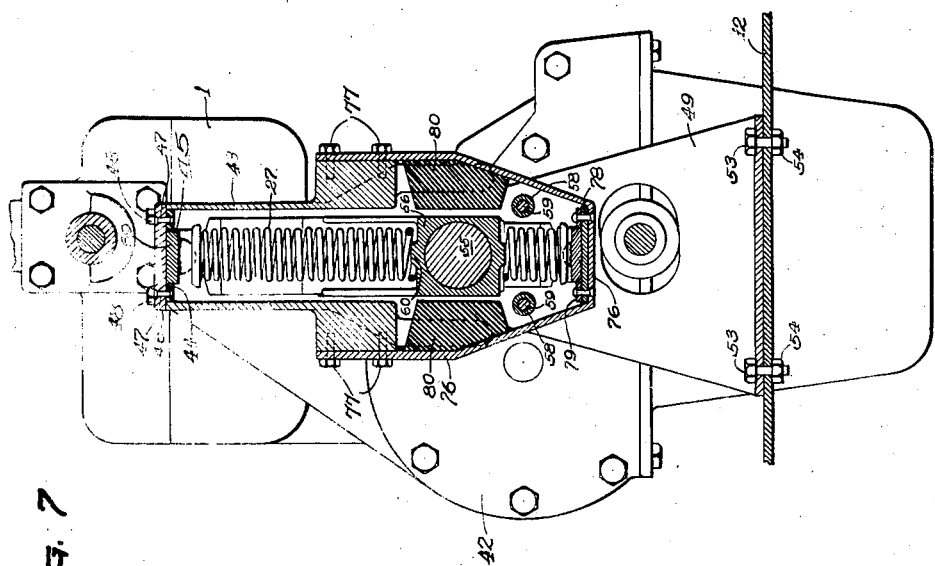

Patented Oct. 9, 1934

1,976,702

UNITED STATES PATENT OFFICE 1,976,702

ENGINE MOUNTING

Rolland S. Trott, Denver, Colo.

Application November 30, 1931, Serial No. 578,111

18 Claims. (Cl. 248—14.2)

My invention relates to engine unit or power plant mountings for automotive vehicles, and is an improvement over my former invention on Engine mountings, as set forth in Patent No. 1,890,871, granted December 13, 1932.

In my former invention, the rear of the power plant was mounted pivotally upon the frame, and the front of the power plant was mounted upon a cross spring carried directly by the front axle, this front spring being so designed and constructed as to cause the movements of the power plant upon its front spring to harmonize as closely as possible with the movements of the vehicle frame upon its springs.

Where the weight of the power plant is large in proportion to its torque, the engine supporting spring must be strong enough to support the weight and perhaps will not be weak enough to properly cushion the torque. Where the torque of the power plant is high in proportion to its weight, the strength of the front engine spring to properly carry the engine torque may be greater than is required to carry its weight, making proper harmony of action between the front of the engine and the front of the frame difficult to obtain.

The object of my present invention is to provide an engine mounting which will more perfectly eliminate engine sensation from the frame and body of the vehicle, irrespective of the relation of the torque to the weight of the engine unit.

A further object is to provide an engine mounting having a front mounting so resilient that it will float with respect to the frame under the least force incident to its operation, while still precluding excessive movement under the larger forces, due to road shocks.

A further object is to provide in a front mounting for an engine unit, a construction which will keep step in periodicity with the vibrations created by the engine unit throughout its entire range of both speed and power, or at least to provide a mounting for the front end of the engine unit such that the forces it exerts upon the support or frame are substantially constant in value, so that substantially no vibration may be perceived by the senses.

A further object is to provide a compound resilient engine unit mounting having a range wide enough to perfectly fit and accommodate for any demands of motor vehicle operation.

I accomplish the above objects by a construction in which the front engine mounting provides orbital and substantially pivotal movements and on which the front of the engine unit normally floats with respect to the frame, that is, in which the vertical forces and weight of the front end of the engine unit are normally carried by resilient means of a low rate per inch of deflection, which will place a substantially constant pressure upon the frame, for properly cushioning the forces due to engine operation, and which resilient means will stiffen up as required to prevent road shocks from imparting excessive engine unit movement, and by constructing all of the above as a complete self-contained front unit that may be attached to the engine unit and to the frame.

Referring now to the drawings, Figure 1 is a fragmentary plan view showing the power plant mounted upon its frame.

Figure 2 is a vertical section taken on the line 2—2, Figure 1.

Figure 3 is similar to Figure 2 but showing the positions assumed by the parts under the impact of road shocks.

Figure 4 is a vertical transverse section on the line 4—4, Figure 2.

Figure 7 is a section on the line of 17—17 of Figure 5.

Figure 8 is a section showing a slight modification in the structure of Figure 5.

Figure 5:
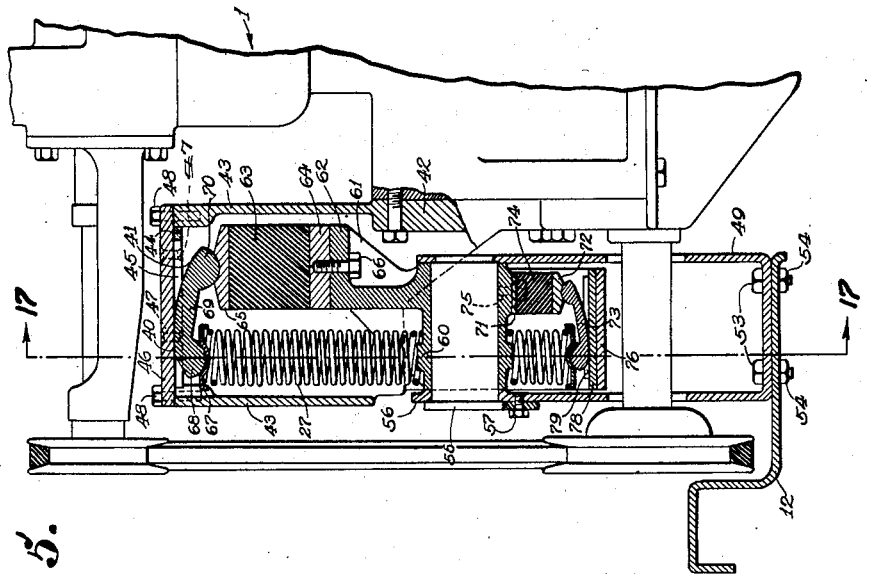
Figure 5 is a sectional view of a modified form of rolling contact front mounting taken on line 13—13 of Figure 6.

In Figure 1, the power plant or engine unit 1 is pivotally mounted on the rear mounting 2, so arranged as to allow torque cushioning and transverse movements of the front end of the power plant 1. Fastened to the part 52 of the engine unit, by the clips 50 and nuts 51, is a cross spring 3 whose ends are diametrically opposite and are resiliently connected with the cross member 8.

It will be seen that any torque cushioning rotation of the engine unit will be opposed by the spring 3. The universal part 9 which extends into the pivotal mounting, is nested in a non-metallic member 10 having a spherically shaped surface to conform with the part 9. The flanged cap 10' is secured to the cross member 8 by the bolts 2'.

This construction will prevent any longitudinal movement of the power plant 1 but will allow substantially pivotal, or orbital movements, due to pivotal or orbital movements of the front end of the power plant 1, the non-metallic part 10 acting to deaden noise and resultant engine unit forces.

The front end of the power plant is arranged and so constructed as to allow both substantially pivotal movement and transverse movement.

The front mounting 11 is mounted upon the cross frame member 12 and supports the front of the power plant 1.

In Figures 2, 3, and 4, the bracket 13 is attached to the engine unit 1 by the bolts 14 or in any other proper manner or may even be integral therewith if such construction is proper. The bracket 13 has the supporting face 15 and the rebound face 16. The ribs 17 brace the support lug 18 and act to guide the rolling levers 19 and 20. The housing 21 is supported upon the frame cross member 12 and secured there by the clips 22, nuts 23, and plates 24 or in any other proper manner. The housing 21 is provided with lugs 25 and 26 for the location of the springs 27, 28, 29, and 30. The springs 27 and 28 are provided with the cup washers 31 and the springs 29 and 30 are provided with the cup washers 32. These cup washers fit upon the surfaced lugs 33 and 34 of the rolling levers 19 and 20. The support lug 18 is provided with apertures 35 and 36 from each side, in which apertures are inserted, the springs 37 and 38 which bear against the walls of the housing 21. The springs 37 and 38, when in position in the lug 18 and bearing outwardly against the walls of the housing 21 are compressed until they are nearly solid, the amount of side float of the engine unit 1 and the bracket 13 in the housing 21 being determined in this way by the construction of the springs 37 and 38.

It will be seen that pivotal action of the engine unit with respect to the housing 21 and the frame of the vehicle is permitted by the spherically cupped spring washers and their engagement with the rolling levers 19 and 20 as well as by the flexibility of the springs 27, 28, 29, 30, 37, and 38. The spring 27 as shown in Figure 2 normally supports the greater part of the weight of the front of the engine unit upon the frame of the vehicle. The rolling lever 19 contacts with the supported surface 15 of the support lug 18 through its upper curved surface which extends from the point 40 to the point 41, both of these points being intermediate the center lines of the springs 27 and 30. The weight of the power plant therefore, will at all times be carried by the combined support of the springs 27 and 30 regardless of the exact position of the contact with the surface 15 as it rolls back and forth between the points 40 and 41. When an obstacle is encountered, the spring 27 will be compressed and the contact will thereby roll toward the point 41, the springs 27 and 30 and the rolling lever 19 finally assuming the position shown in Figure 3. As this action is taking place, the spring 28 maintains the rolling lever 20 in contact with the surface 16 of the support lug 18 at the point 40 and since the point 40 is intermediate the center lines of the springs 28 and 29, the pressure of the spring 28 will maintain the rolling lever 20 in contact with the washer 32 and the spring 29, the position finally assumed by the parts being shown in Figure 3.

On the rebound from a road obstacle, the upward movement of the engine unit and the bracket 13 will compress the spring 28, the contact rolling on the lever 20 from the point 40 to the point 41 and the spring 27 maintaining the rolling lever 19 in contact with the surface 15 with the final position of all parts similar to that shown in Figure 2, except that the rolling lever 20 will finally contact with the surface 16 at the point 41 and the rolling lever 19 will maintain contact with the surface 15 at the point 40.

Since the normal float of an engine incident to its operation, is say $\frac{1}{32}$ of an inch, then the curve of the rolling levers may be made such as to cause the point 41 to be normally spaced say, about $\frac{1}{8}$ of an inch from the cooperating face of the support lug 18.

If the front of the engine weighs 400 pounds, and the spring 27 which is a relatively low deflection rate spring is made with a 40 pound to the inch deflection rate, it will, when free, be ten inches longer than as shown in Figure 2. And in its float of $\frac{1}{32}$ of an inch, the contact point of the lever 32 will travel roughly one-fourth of the distance toward the center line through the spring 5.

In this float of $\frac{1}{32}$ of an inch due to engine vibration, the 40-pound-to-the-inch spring 27 will be compressed roughly that amount, putting 1¼ pound additional load upon the housing 21 and the frame of the vehicle. This will result in no perceptible vibration in the motor car.

When a road bump is encountered, the frame of the vehicle, will move upward, but, due to the ordinary frame springs, the movement will be much slower than the upward movement of the vehicle's axles. But, even at that, it will result in a plunging load being put upon the engine mounting that is greater than the ordinary weight of the engine unit. As this additional load is put upon the support lug 18, it will force the spring 27 downward, and in so doing, the rolling lever contact with the surface 15 will move toward the point 41.

The spring 30 which is a relatively low deflection rate spring will take care of the additional load, whatever it may be, while the spring 27 will continue to carry substantially an unchanged load. That is, if the spring 27 is compressed by a road bump as much as half an inch, it will then carry 20 pounds more than normal; while the spring 30 will carry the remainder of the increased load put upon the mounting by the road shock. As a matter of fact, since the points 40 and 41 are between the two center lines as shown, the spring 27 will normally carry perhaps 360 pounds instead of 400 as stated, but the round figures are used for ease in explanation.

In any case it will be seen that both support means are resilient and both carry a part of the load at all times so that there will be no thud, shock, or sudden contact at any time.

Normally the spring 27 is the important factor, while for abnormal conditions the spring 30 is the important factor, with the spring 27 still supporting substantially the same load at all times. Thus, my front mounting provides a very light float to absorb all engine vibration, limited lateral float, within resilient limits being also provided by the springs 37 and 38. The excess loading due to road conditions, is smoothly and properly taken care of without thud or noise and the rebound is likewise properly taken care of without thud or noise since the rebound construction is substantially the same as the load supporting construction.

If, for any reason, my rear unit such as shown in Figure 1, is not desired, then my front rolling contact mounting may be employed with any other proper rear mounting that will accommodate for the movements permitted by my front rolling contact mounting, and the torque connection may be made from the engine unit to the frame, to the front reach, to the rear reach, to the front axle, or to any part of the vehicle whereby the torque cushioning movements may be resiliently limited.

Figure 6:
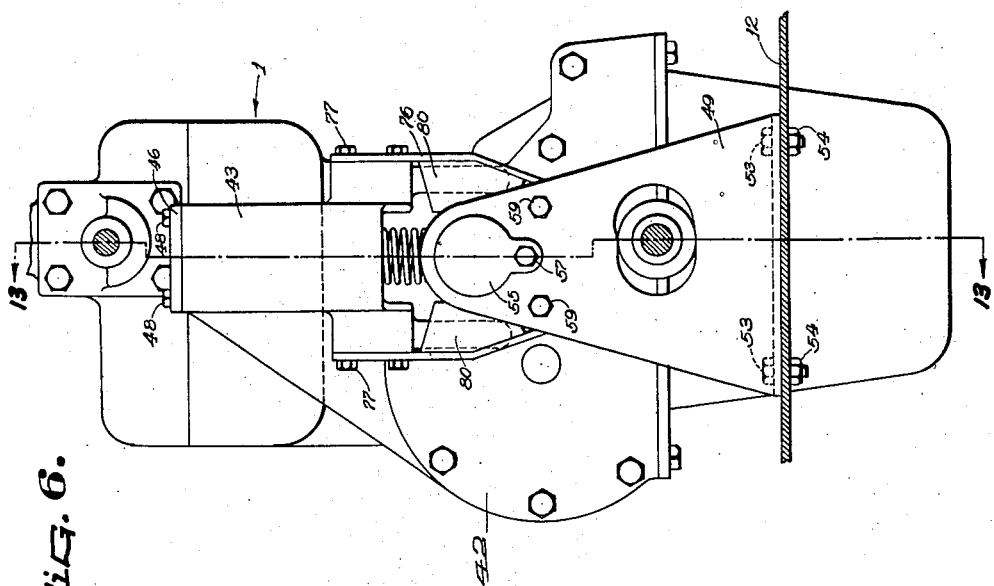
Figure 6 is an end elevation of Figure 5.

In Figures 5, 6, and 7 is shown a variation in which the housing is attached to the engine unit, a pivotal construction is provided and non-metallic cushions are employed except for the low deflection rate springs. The gear cover 42 of the engine unit 1 has a forwardly extending wall 43, the guide plate 44 having the aperture 45, is secured to the support plate 46, by the rivets 47 or in any other proper manner. The support plate 46 is secured to the walls 43 by the bolts 48. The frame bracket 49 is attached to the frame member 12 by the bolts 53 and nuts 54, and carries the trunnion 55 upon which is mounted the trunnion housing 56. The trunnion 55 is secured in the frame bracket 49 by the bolt 57 and the frame bracket 49, at its upper end is secured against spread by the sleeves 58 and bolts 59. The trunnion housing 56 has the lug 60 for positioning the floating spring 27 and also carries the bracket 61 with the base 62. The support cushion 63 of rubber or other proper resilient material has the plates 64 and 65 vulcanized or otherwise properly attached thereto, and plate 64 is secured to the base 62 by the bolts 66. The floating spring 27 has the spherically cupped washer 67 for the reception of the spherically shaped lug 68 of the rolling lever 69. The rolling lever 69 has a spherical lug 70 which fits into a seat made for that purpose in the plate 65. The rolling lever 69 has a curved upper face between the points 40 and 41 and in operation rolls upon its contact with the support plate 46, being guided by the guide plate 44, operating in substantially the same manner as the construction shown in Figures 2 and 3. The rolling lever 73 rebound cushion means 74, plates 71 and 72, and bolts 75, all operate substantially the same as the construction shown above the trunnion 55 and described hereinabove. The rebound bracket 76 is properly attached to the walls 43 by the bolts 77, the rolling lever 73 contacting the rebound plate 78 and being guided by the guide plate 79. The cushions 80 of rubber or other proper material are vulcanized or in any other proper manner attached to the rebound bracket 76 and act to resiliently oppose the side float of the engine unit while not affecting its vertical float.

It will be apparent to anyone versed in the art, that springs may be employed in the construction shown in Figures 5, 6, and 7 the same as in the construction shown in Figures 2, 3, and 4; also it will be apparent that the rubber cushions may be employed in the construction shown in Figures 2, 3, and 4, for in any case the results for both will be the same in that the engine unit is normally floated mostly upon the low rate deflection, resilient mounting means, and an increasing amount by the high rate deflection, resilient mounting means depending upon the condition of tthe roads encountered, and in either construction the engine unit may have a substantially pivotal movement and may float, not only vertically, but horizontally, with respect to the frame and thereby provide the orbital movement which is required to properly cushion all the forces incident to the operation of the engine unit. If desired, the rebound spring and rolling lever 73, and cushion 74 may all be replaced by a non-metallic resilient cushion 74' (see Figure 8) similar to the cushions 80, but normally out of contact with the housing 56 so as to permit the perfectly free normal vibration incident to engine operation and to contact with the housing 56 only upon the rebound from an abnormal engine movement. Or, if desired, in place of such a cushion, a spring similar to the springs 37 may be employed to replace the spring, rolling lever and cushion shown in Figures 5 and 7, the result, in any case, being that the rebound of the engine unit from an abnormal downward movement with respect to the frame is resiliently limited.

It will now be seen that by the use of my rear mounting unit composed of a cross member, engine mounting, and torque construction, and the use of my front rolling contact mounting, I provide an engine mounting in which all forces transmitted to the frame of the vehicle from the engine unit will be so close to constant in value as to reduce the vibration transmitted to the frame to a minimum. But in case my rear assembly construction is not desired, my front rolling contact mounting may be used with a proper rear mounting in combination with any desired stabilizer construction between the engine unit and some part of the vehicle.

Having now described my invention, what I claim as new and desire to protect by Letters Patent is as follows:

1. In a motor vehicle having a frame, and an engine unit, means mounting the rear of the engine unit thereof movably upon the frame of the vehicle, stabilizer means between the engine unit and some part of the vehicle, and a front mounting between the engine unit and the frame of the vehicle composed of high and low deflection rate resilient means and a curved member supported thereby and supporting said engine unit, said member being arranged for movement of the point of support toward the high deflection rate resilient means as the load increases.

2. In a motor vehicle having a frame, and an engine unit, means mounting the rear of the engine unit thereof movably upon the frame of the vehicle, stabilizer means between the engine unit and some part of the vehicle and a front mounting between the engine unit and the frame composed of high and low rate resilient supporting and rebound means, contact means each having a high and low deflection rate resilient means bearing thereagainst, and having a longitudinally curved surface, and means carried by the engine unit having a rolling contact with said contact means toward the high deflection rate resilient means as the load increases.

3. In a motor vehicle having a frame, and an engine unit, means mounting the rear of the engine unit thereof movably upon the frame of the vehicle, stabilizer means between the engine unit and some part of the vehicle and a front mounting between the engine unit and the frame of the vehicle composed of high and low rate resilient support and rebound means, said supporting means supporting the front of the engine unit, said rebound means acting to limit the rebound thereof, and supporting and rebound members engaging the supporting and rebound, high and low rate resilient supporting and rebound means respectively, and means engaging said supporting and rebound means and having a rolling contact therewith toward the high deflection rate resilient means as the front of the engine unit moves vertically with respect to the frame due to an increase in load.

4. In a motor vehicle, means mounting the rear of the engine unit thereof movably upon the frame of the vehicle, stabilizer means between the engine unit and some part of the vehicle and a front mounting between the engine unit and the frame of the vehicle composed of high and low rate resilient support and rebound means, said supporting means supporting the front of the engine unit, said rebound means acting to limit the rebound thereof, and supporting and rebound members engaging the supporting and rebound high and low rate resilient supporting and rebound means respectively and means engaging said supporting and rebound members and having a rolling contact therewith as the front of the engine unit moves vertically with respect to the frame and means resiliently locating the front of the engine unit laterally with respect to the frame.

5. In a motor vehicle, the combination of an engine unit, and supporting means for the end portions of said engine unit, the supporting means for at least one end portion having high and low deflection rate resilient means, and a member carried thereby and having rolling contact with the engine unit toward the high deflection rate resilient means as the load increases.

6. In a motor vehicle, the combination of an engine unit, and mountings for supporting end portions of the engine unit, at least one of said mountings comprising a longitudinally curved member supporting a portion of the engine unit, and high and low deflection rate resilient means separately engaging spaced portions of said curved member, said curved member supporting the engine unit by rolling contact longitudinally relative thereto toward the high deflection rate resilient means as the load increases.

7. In a motor vehicle, the combination of an engine unit, and mountings for supporting the front and rear portion of the engine unit, the front mounting comprising a longitudinally curved member supporting a portion of the engine unit, resilient means bearing against an end portion of said curved member and normally supporting approximately all of the weight thereon, and auxiliary resilient means of different resiliency from said first-mentioned resilient means and bearing against the opposite end portion of the curved member, said curved member being arranged for movement of the point of support toward the auxiliary resilient means as the load is increased.

8. In a motor vehicle, the combination of an engine unit and mounting means therefor including a member having a longitudinally curved convex surface arranged to bear against a support for the engine unit, and resilient means bearing against opposite end portions of said member, the resilient means at one end portion being of different resiliency from the resilient means at the other end portion, whereby the point of contact between the curved member and the support moves toward the resilient means of low resiliency as the load is increased.

9. A mounting structure for a portion of an engine unit comprising supporting and supported structures, high and low deflection rate resilient means, and a member between the resilient means and one of said structures so constructed and arranged that the point of contact between the member and the structure moves toward the high deflection rate resilient means as the load is increased.

10. In a motor vehicle, the combination with an engine unit, of means for mounting said engine unit in the vehicle, comprising high and low deflection rate resilient means, and a member between the resilient means and a portion of the engine unit so constructed and arranged that the point of contact between the member and the engine unit portion moves toward the high deflection rate resilient means upon an increase in the load on said member.

11. In a motor vehicle, the combination with an engine unit, of means for mounting said engine unit in the vehicle, comprising high and low deflection rate resilient means, and a member between the resilient means and a portion of the engine unit so constructed and arranged normally to apply the major portion of the load to the low deflection rate resilient means and to cause the point of contact to move toward the high deflection rate resilient means upon an increase in the load on said member.

12. In a motor vehicle, the combination with an engine unit, of means for mounting said engine unit in the vehicle comprising separate high and low deflection rate resilient means, and floating means carried by said separate resilient means and supporting a portion of the engine unit, said supporting means having supporting contact with the engine unit portion constructed and arranged for causing minimum shocks to be mainly sustained by the low deflection rate resilient means and for causing maximum shocks to be mainly sustained by the high deflection rate resilient means.

13. In a motor vehicle, the combination of a suitable support element, an engine unit element carried thereby, mounting means for said engine unit element comprising support means connected with one of said elements, rolling levers engaging the support means from opposite sides, and springs flanking these rolling levers and exerting pressure thereagainst.

14. In a motor vehicle, the combination of a suitable support element, an engine unit element carried thereby, mounting means for said engine unit element comprising support means connected with one of said elements, a housing connected with the other and enclosing said support means, rolling levers engaging the support means from opposite sides, springs flanking these rolling levers and exerting pressure thereagainst, and elastic means of diverse deflection rates interposed between the housing and the levers and engaging opposite ends of the latter.

15. In a motor vehicle, the combination with an engine unit, of means for mounting longitudinally spaced portions of said engine unit in the vehicle, the mounting means for one of said portions comprising a housing carried by a portion of the vehicle, a pair of coil springs carried by and disposed within said housing, said springs being of high and low deflection rate, a rolling lever arranged in bridging relation between and having universal connection with said springs, said lever having a longitudinally curved surface, and a support connected with the engine unit and having a surface bearing upon and supported by the curved surface of the lever, the lever being arranged normally to carry the major portion of the load on the low deflection rate spring and for movement of the point of support toward the high deflection rate spring as the load is increased due to shock.

16. In a motor vehicle, the combination with an engine unit, of means for mounting longitudinally spaced portions of said engine unit in the vehicle, the mounting means for one of said portions comprising a housing carried by a portion of the vehicle, a pair of coil springs carried by and disposed within said housing, said springs being of high and low deflection rate, a rolling lever arranged in bridging relation between and having universal connection with said springs, said lever having a longitudinally curved surface, and a support connected with the engine unit and having a surface bearing upon and supported by the curved surface of the lever, the lever being arranged normally to carry the major portion of the load on the low deflection rate spring, and for movement of the point of support toward the high deflection rate spring as the load is increased due to shock, a second rolling lever having a longitudinally curved surface bearing against the opposite side of the support from the first mentioned lever, and high and low deflection rate resilient rebound means interposed between the opposite ends of the second rolling lever and the housing for cushioning the rebound, the high and low deflection rate resilient rebound means being vertically aligned respectively with the high and low deflection rate springs.

17. A mounting structure for a portion of an engine unit comprising supporting and supported structures, a pivot carried by said supporting structure, metallic resilient means of low deflection rate, non-metallic resilient means of high deflection rate, and a member between the metallic and non-metallic resilient means and the supported structure so constructed and arranged that the point of contact between the member and the supported structure moves toward the high deflection rate resilient means as the load is increased.

18. The combination with a frame and an engine unit, of means mounting the engine unit on the frame comprising a bracket at an end of the engine unit, a pivot pin carried by the bracket, a trunnion housing mounted on the pivot, a projection attached to a portion of the engine unit, a rocking lever bearing against said projection, and metallic and non-metallic resilient means of different deflection rates interposed between the rocking-lever and the trunnion housing.

ROLLAND S. TROTT.